United States Patent
Bilhan et al.

(10) Patent No.: US 6,791,607 B1
(45) Date of Patent: Sep. 14, 2004

(54) OPTICAL BLACK AND OFFSET CORRECTION IN CCD SIGNAL PROCESSING

(75) Inventors: Haydar Bilhan, Dallas, TX (US); Ramesh Chandrasekaran, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 758 days.

(21) Appl. No.: 09/703,558

(22) Filed: Nov. 1, 2000

Related U.S. Application Data

(63) Continuation of application No. 09/353,919, filed on Jul. 15, 1999.
(60) Provisional application No. 60/092,912, filed on Jul. 15, 1998.

(51) Int. Cl.[7] .................................................. H04N 9/64
(52) U.S. Cl. ...................................... 348/243; 348/250
(58) Field of Search ........................ 348/207.99, 222.1, 348/241, 243, 248, 249, 250, 294, 311

(56) References Cited

U.S. PATENT DOCUMENTS

| | | | |
|---|---|---|---|
| 5,642,162 A | * 6/1997 | Maki et al. | .................. 348/241 |
| 5,841,793 A | * 11/1998 | Fukuda | ........................ 714/752 |
| 6,005,615 A | 12/1999 | Tsuda | |
| 6,049,355 A | 4/2000 | Kameyama | |
| 6,084,634 A | * 7/2000 | Inagaki et al. | ............... 348/294 |
| 6,304,292 B1 | * 10/2001 | Ide et al. | ..................... 348/243 |

* cited by examiner

*Primary Examiner*—Tuan Ho
(74) *Attorney, Agent, or Firm*—April M. Mosby; Wade James Brady III; Frederick J. Telecky, Jr.

(57) ABSTRACT

An image processing apparatus for a charge coupled device including analog front end circuitry having optical black and offset correction, whereby the an offset and optical black correction circuit has a digitally programmable bandwidth is disclosed herein. The image processing apparatus includes a sampling circuit to sample the incoming optical black signal output from a CCD. The sampled signal is filtered through an analog-to-digital converter for processing by a digital detector circuit which detects the average optical black level of the sampled signal. The sum of the channel offset and optical black level present at the output of the digital detector circuit as a digital error signal is averaged for a given number of lines and optical black cells per line by a digital averager included within the digital detector circuit. Moreover, calibration logic digitally calibrates the channel to obtain a user programmed ADC output which corresponds to that average. Furthermore, the correction circuit includes a digital-to-analog converter that converts the difference into an analog signal to be applied as an adjustment to the analog image signal at the input of the image processing apparatus. Thus, the error signal is fed back to the analog channel through the DAC in order to modify the existing signal such that a desired optical black level at the output of the ADC exists.

7 Claims, 5 Drawing Sheets

OPTICAL BLACK AND OFFSET CORRECTION IN CCD SIGNAL PROCESSING

CROSS-REFERENCE TO RELATED APPLICATION

This application is a continuation of U.S. application Ser. No. 09/353,919, filed Jul. 15, 1999, which claims priority under 35 U.S.C. § 119(e)(1) of provisional application No. 60/092,912, filed Jul. 15, 1998. The present invention relates to a copending application entitled "A Digital Scheme for Noise Filtering of Optical Black and Offset Correction in CCD Signal Processing," Serial No. TBN, filed on Sep. 3, 1999, which is incorporated by reference herein.

FIELD OF THE INVENTION

The present invention relates to image processing, and, more particularly, to an analog front end for a charge coupled device and CMOS imager, which provides digital optical black and offset correction.

BACKGROUND OF THE INVENTION

Advances in integrated circuit design and manufacturing have enabled low cost, highly integrated, high performance image processing products, including the digital electronic cameras. A conventional camera comprises an image sensor, typically an array charge coupled device (CCD), an analog front end (AFE) and a digital image processor. Most analog front ends having optical black and offset calibration include schemes that integrate the error signal on a capacitor during an optical black period and feed back the voltage generated to the input to cancel the offset or the optical black value during the video interval.

As shown in circuit 100 of FIG. 1, the CCD 102 which is an integrated array of photocells used in digital imaging is connected to a capacitor 104 and a clamp circuit 106 for AC coupling. The AFE connected to the capacitor 104 generally includes three main elements: a correlated double sampler 108 (CDS), a programmable gain amplifier 110 (PGA), and an analog to digital converter 112 (ADC). The fundamental goal in any camera design is to extract as much dynamic range from the image sensor without adding any noise with the subsequent circuitry.

The specific operation of the conventional image process apparatus 100 with such a construction is described referring to the timing charts of CCD 102 output in FIG. 2a and 2b. Particularly, the output of the CCD 102 contains a reset pulse, the reference level and the video level. Output from the CCD 102 is sampled twice by CDS 108 such that the first sample is taken during the reference level and the second sample is taken during the video signal. The difference is the corresponding CDS 108 output. This difference between the optical black level and the video level represents the actual image value for any given pixel.

As shown in FIG. 2b, a dark cell does not produce a zero differential output, due to the dark currents of the photocells, which may vary from pixel to pixel and line to line in a frame. Due to the dark current or "optical black level" and the internal offsets of all amplifiers used in the CDS 108, PGA 110, and ADC 112, the resulting ADC 112 output for a dark cell will not be zero. Further complicating the matter, the CDS 108 offset and the optical black level are multiplied by the gain from the PGA 110. Thus, in order to achieve the ideal dynamic range for the signal, the black level and the offsets must be removed.

The function of the CDS 108, as illustrated in FIG. 2a and 2b, is to sense and produce a voltage difference between the reference level and the video level of each pixel. The most important benefit of using CDS 108 is to reduce noise. In addition to the capturing of the video data by subtracting the reference levels from the video levels, any noise common to these two signals are removed by the CDS 108.

One approach for canceling an offset in switched capacitor amplifiers is to put the amplifier in unity gain feedback during the sampling phase. This way the input offset is also sampled and canceled during the amplification phase. For applications, however, where high speed and high closed loop gain are required, stable amplifiers at unity gain feedback can not be maintained. In addition, this approach will not correct the optical black level.

Another approach corrects the optical black level using the feedback circuit 300 displayed in FIG. 3. It integrates the optical black error on an integrator and applies a negative feedback to the input of the PGA 306. The feedback circuit operates to control the level of the analog optical black signal to a predetermined level.

This technique, however, lacks the flexibility of digital programmability and requires analog circuit complexity, sometimes even off-chip capacitors. This technique also relies on device matchings which may cause a yield issue. It is also not suitable for discrete time (switched capacitor) systems because of the latency at the amplifier outputs. In the alternative, however, post digital optical black correction techniques are not desired, since it is better to cancel the offset in analog domain for an optimum dynamic range.

An approach disclosed in U.S. Pat. No. 6,049,355 which is incorporated by reference herein includes a clamping circuit 400 for use in a video camera that varies the level of the image signal utilizing level varying circuitry 401 which receives an analog feedback control signal from control signal generating unit 408 and converts the varied image signal to a digital image signal using ADC 402. Level detection circuit 404 generates a digital zone value signal that corresponds to a level of a reference zone of the digital image signal. Further, the error detection circuit 406 digitally detects an amount of error between the digital zone value signal and a predetermined zone value having a non-zero factional portion. From the detected amount of error, it generates a digital error signal that has a predetermined number of data bits. The circuit 400 then switches between a coarse adjustment mode and a fine adjustment mode in accordance with a level of the digital error signal. In the coarse adjustment mode, a pulse width modulated signal from the most significant bits of the digital error signal is used to apply an coarse adjustment to the incoming signal. In the fine adjustment mode the pulse width modulated signal from the least significant bits of the digital error signal, and generates from the generated pulse width modulated signal the analog feedback control signal.

The difficulty existing with this scheme is that the loop gain must be switched. Such precision is not easily achieved. This approach relies heavily upon pulse width modulation and an integrator feedback to generate a coarse and fine adjustment using most and least significant bits respectively.

Thus, there exists a need for an all digital programmable optical black and offset correction circuit for CCD signal processing suitable for discrete time switched capacitor systems.

SUMMARY OF THE INVENTION

To address the above-discussed deficiencies of the analog front end circuitry having optical black and offset correction, the present invention teaches an offset and optical black correction circuit having a digitally programmable bandwidth. A first embodiment of the image processing apparatus in accordance with the present invention includes a sampling circuit to sample the incoming optical black signal output from a CCD. An analog-to-digital converter converts the sampled signal for processing by a digital detector circuit which detects the average optical black level of the sampled signal. The sum of the channel offset and optical black level present at the output of the digital detector circuit as a digital error signal is averaged for a given number of lines and optical black cells per line by a digital averager included within the digital detector circuit. A digital comparator receives a digital reference signal and the averaged optical black and channel offset data output from the digital averager to compare the optical black signal with the reference signal. This difference is transmitted to a correction circuit to correct the optical black level which feeds back an adjustment to be applied to the analog image signal. More particularly, the correction circuit includes a digital-to-analog converter (DAC) that converts the difference into an analog signal to be applied as an adjustment to the analog image signal at the input of the image processing apparatus. Thus, the error signal is fed back to the analog channel through the DAC in order to modify the existing signal such that a desired optical black level at the output of the ADC exists.

In a second embodiment, the correction circuit includes a first and a second DAC, used to apply a coarse and fine adjustment to the image signal at differing points in the analog channel. The sampling circuit within this embodiment may include a correlated double sampler (CDS) and a programmable gain amplifier such that the coarse adjustment would first be applied to the image signal before to the PGA and the fine adjustment would be applied to the amplified image signal after the PGA. This embodiment, relative to the first embodiment, increases the accuracy when the gain of the PGA is high.

Advantages of this design include but are not limited to an analog front end circuit having mixed signal optical black and offset circuitry that is highly programmable. This circuit has an improved dynamic range for image processing over other approaches. As such, this highly programmable design can be used both in discrete and continuous time systems and does not require any off-chip components.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

In accordance with the present invention, the sum of the channel offset and optical black level is averaged for a given number of lines and optical black cells per line. Furthermore, the channel is digitally calibrated through digital to analog conversion to obtain a user programmed ADC output which corresponds to that average.

Figure 1:
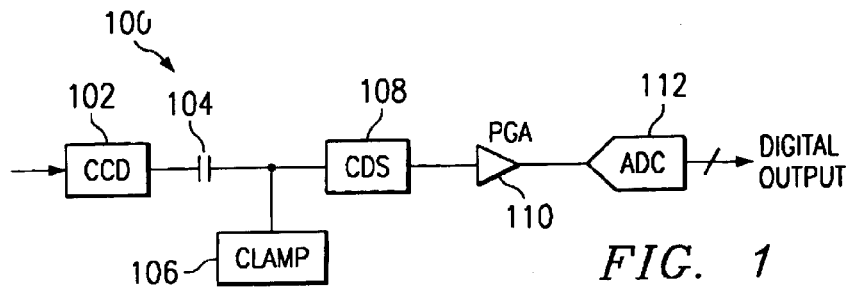
FIG. 1 is a block diagram of a known embodiment of an analog front end for a CCD.
Figure 2A:
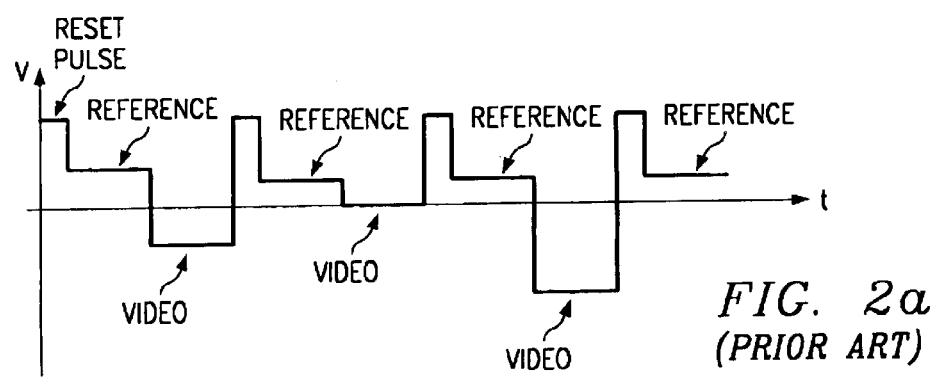
FIG. 2a and 2b are waveforms useful in understanding the circuit of FIG. 1.
Figure 2B:
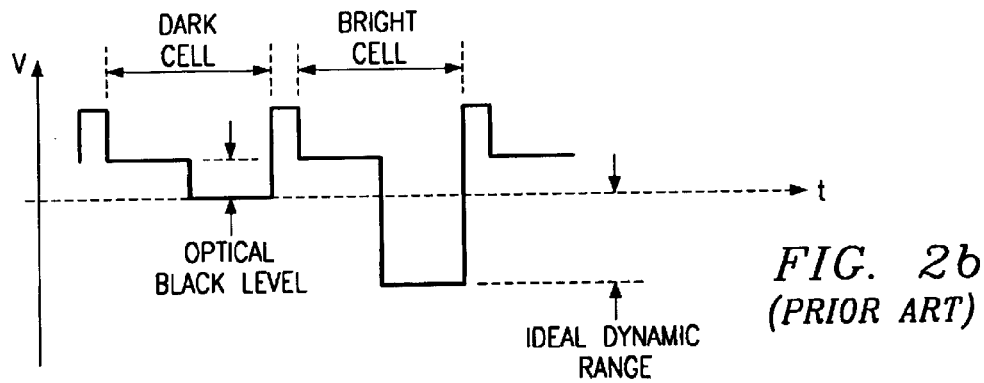
Figure 3:
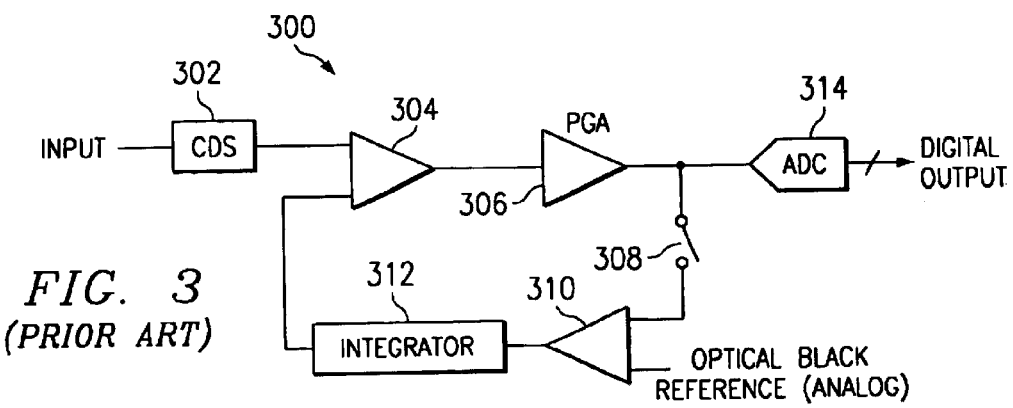
FIG. 3 illustrates a known embodiment of an optical black calibration system using an integrator.
Figure 4:
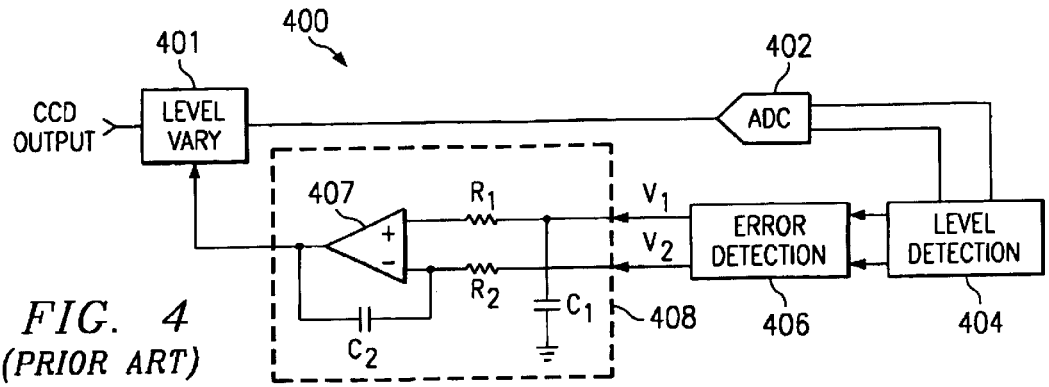
FIG. 4 shows a known embodiment of an optical black calibrations system using an integrator and pulse width modulation.
Figure 5:
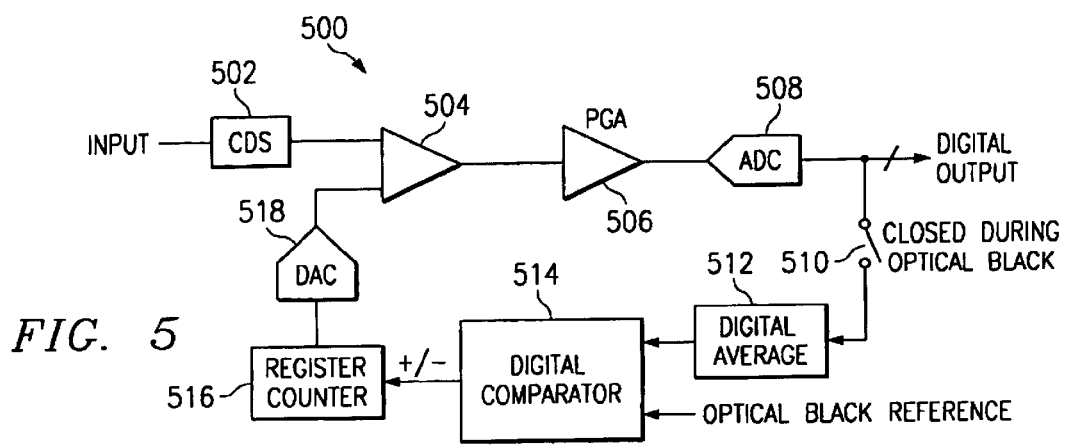
FIG. 5 illustrates a first embodiment of an optical black calibration system in accordance with the present invention.
Figure 6:
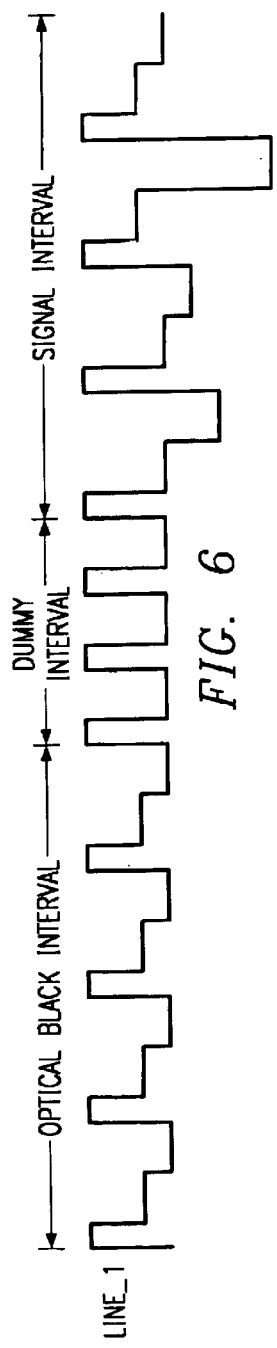
FIG. 6 is a waveform illustrating a CCD output frame with an optical black interval and a signal interval.

Particularly, a first embodiment of an analog front end circuit 500 in accordance with the present invention is shown in FIG. 5. This circuit 500 provides a CCD signal processing method for optical black offset correction using a moving average filter scheme such that the optical black pixels are averaged at the beginning of each line and the offset is canceled. AFE 500 includes a correlated double sampler (CDS) 502 coupled to operational amplifier 504 for adding an adjustment derived by the feedback loop. A programmable gain amplifier (PGA) 506 receives the sampled signal and transmits this signal to an analog-to-digital converter (ADC) 508. The feedback loop includes a switch 510, a digital averager 512, a digital comparator 514, a counter 516 and DAC 518. Switch 510 couples to digital averager 512 for selectively processing the signal during the optical black interval of the image signal (refer to FIG. 6). Digital averager 512 connects to the digital comparator 514 to compare the average optical black level with an optical black reference value. The difference is stored in counter 516 and forwarded to DAC 518 to be applied to the output signal from CDS 502.

The purpose of AFE 500 is to convert a CCD output signal to digital data for subsequent digital signal processing. In operation, at the input of the AFE 500, the DC level of the CCD output signal is clamped to the input dynamic range. To enhance noise performance and dynamic range, correlated double sampling is applied to the clamped input signal. The output of CDS 502 is amplified by a PGA 506 that varies exponentially with linear control. ADC 508 converts the amplified analog signal to digital data.

Using the feedback loop, optical black value and channel offset are corrected in order to maximize the dynamic range. Switch 510 closes during optical black level sampling of the signal to present digital averager 512 with the optical black interval for averaging the optical black pixel value. A comparator 514 compares the reference optical black level with the averaged optical black level. It provides an up and down control signal to the up/down counter 516. Counter 516 counts up or down until the output of the ADC 508 converges to the desired optical black level. DAC 518 converts the output of the counter into an analog voltage to be applied to the image signal output from CDS 502.

This circuit arrangement, however, will take an unknown repetition of feedback lines to cancel the optical black level offset. Also, if the PGA gain is too high, the accuracy of the cancellation may be poor.

The second embodiment provides optical black offset correction using a moving average filter scheme such that the optical black pixels are averaged at the beginning of each line and offset DACs, DAC-C 714 and DAC-F 716, are updated in order to cancel the offset. A digital block takes the average of the ADC outputs for optical black level and controls the two DACs, 728 and 730, in order to compensate for the channel offset and optical black correction. An adjustment provided by DAC 728 before PGA 706 is used in order to correct the coarse offset and an adjustment provided by DAC 730, placed after PGA 706, is used for fine offset correction.

Figure 7:
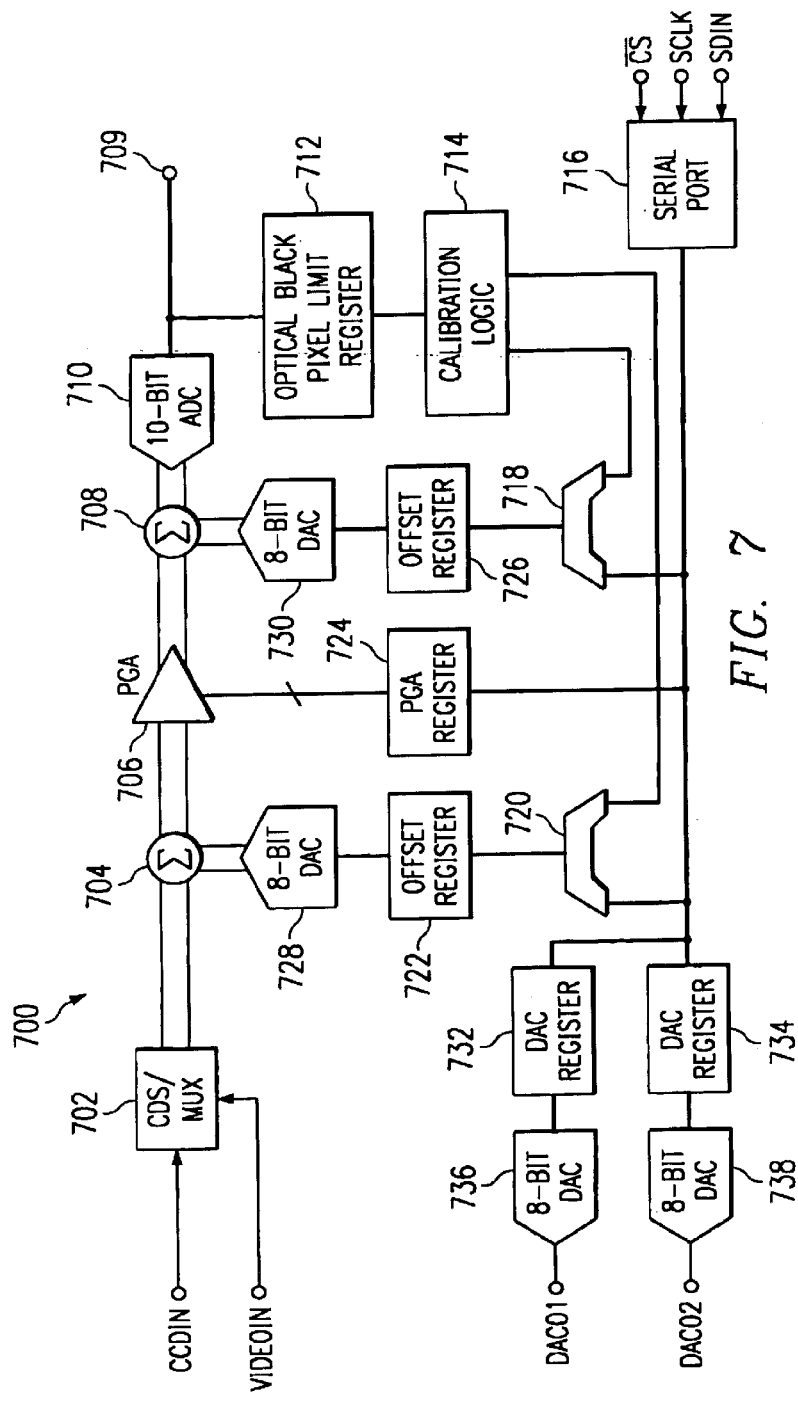
FIG. 7 is a block diagram of a second embodiment of the optical black offset correction apparatus in accordance with the present invention.

Specifically, as shown in FIG. 7, AFE 700 includes CDS 702 coupled to summer 704 for adding or subtracting a coarse adjustment derived by the feedback loop. PGA 706 receives the sampled signal and transmits this signal to summer 708 for adding or subtracting a fine adjustment derived by the feedback loop. The result is converted by ADC 710 to be fed to the feedback loop. The feedback loop includes optical black pixel limit register 712, calibration logic 714, multiplexers 718, 720, offset registers 722 and 726, PGA offset register 724, and DACs 728 and 730. Optical black pixel limit register 712 acts as a detector circuit for selectively processing the signal during the optical black interval of the image signal (refer to FIG. 6). The calibration logic 714 averages the optical black level and compares with an optical black level reference. One embodiment of calibration logic 714 may include a digital averager (not shown) and comparator (not shown) coupled together, wherein the calibration logic uses the digital averager and digital comparator to compare the average optical black level with an optical black reference value. The derived differences are stored in registers 722 and 726 and forwarded to DACs 728 and 730 to be applied to the output signal from CDS 702.

A method in accordance with the present invention corrects the offset and optical black value in the analog domain using a coarse and fine adjustment mode. Digital optical black correction circuit 712 determines the necessary amount that the analog offset of the image signal should be adjusted. DAC-C 714 and DAC-F 716 provide offsets in the coarse and fine adjustment modes, respectively. This highly programmable technique can be used both in discrete and continuous time systems and does not require any off-chip components.

In operation, CCD image lines are shifted vertically to a line register, then the pixels on this line are shifted horizontally to an output pin.

For each line, ADC 710 outputs a signal corresponding to the sampled optical black levels which are averaged by the digital block. The user can program the number of optical black cells per line and the number of lines to be averaged by calibration logic 714. The user may initiate an optical black pulse for activating the optical black interval, as shown in the timing diagram of FIG. 6. The resulting average is compared with the desired output for optical black level. If they are equal, both offset DACs, 728 and 730, are kept the same. Given the equation below:

$$OB_{desired} - OB_{average} + DAC_{730}(n-1) = DAC_{730}(n)_{offset} \quad [1]$$

where $OB_{desired}$ represents the desired optical black level, $OB_{average}$ represents the average ADC output for optical black cells, $DAC_{730}(n-1)$ represents the previous fine DAC 730 register value, and $DAC_{730}(n)_{offset}$ represents the new value for the fine DAC 730. If the average ADC output is not equal to the desired value and if the value of $DAC_{730}(n)_{offset}$ is within the range of fine DAC 730 which is +/−255 ADC least significant bits (LSBs) for an 8-bit DAC, the value of $DAC_{730}(n)_{offset}$ is immediately written to the fine DAC 730 register.

If the offset is out of the range of the fine DAC 730, the coarse DAC 728 is incremented or decremented depending upon whether the offset is positive or negative. Coarse DAC 728 is in closed loop feedback for each line during optical black pixels. Once in the coarse mode, the system continues updating DAC 728 until the output is at the center of its correction range; thus, optimizing the use of both DAC 728 and 730. The remaining residue is corrected by the fine DAC 730.

In coarse mode, it may take more than one repetition to correct the offset; but in fine mode, the offset is corrected immediately for each line. Because of the optimization described above, for relatively large optical level swings up to +/−255 LSBs for an 8-bit DAC 730, these offsets will be corrected immediately in fine mode without switching to coarse mode.

Since ADC 710 will clip off the negative portion of the signal and respresent it as a digital '0', calibration logic 714 forces the analog channel to add an intentional offset that corresponds to 255 ADC LSBs during the optical black interval. This addition of 255 LSB offset in analog domain is after the PGA gain (not shown in FIG. 7). The implementation can be done in a variety of ways, especially utilizing switched capacitor circuits. In this manner, negative offsets will not be clipped off at the digital output and will be mapped to a 255-offset during the optical black period interval. Since the offset does not exist during signal interval, it is transparent to the digital signal processor or application specific integrated circuit (ASIC) used for example, in a digital camera.

Figure 8:
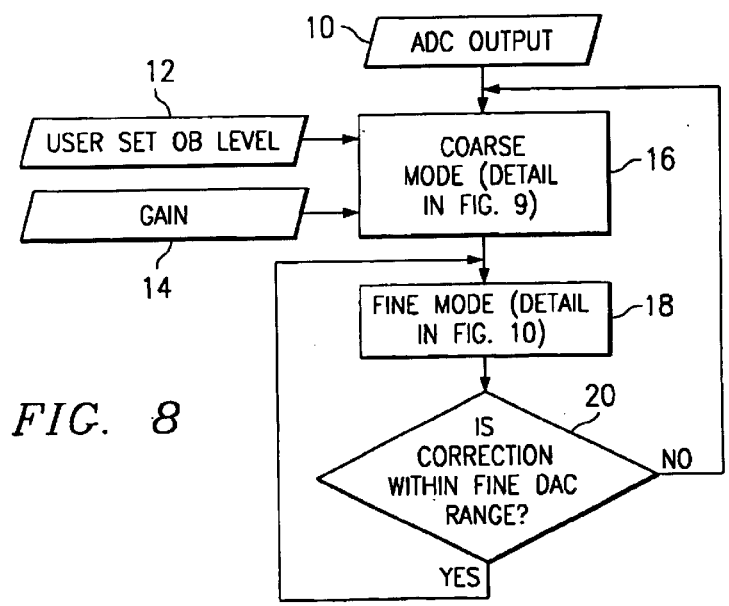
FIG. 8 is a flow chart for the coarse and fine adjustment mode of the optical black offset correction apparatus in accordance with the present invention.
Figure 9:
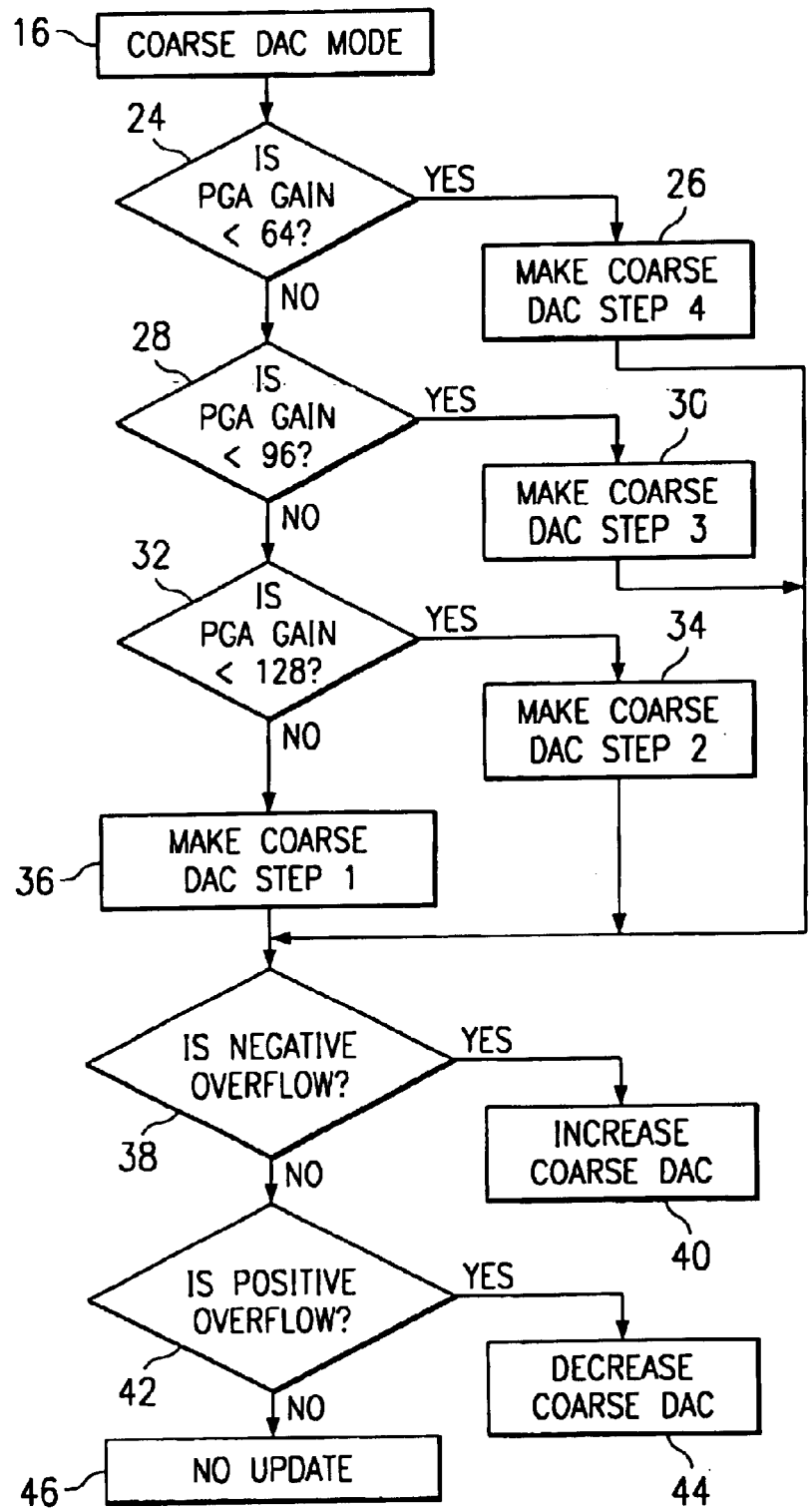
FIG. 9 is a flow chart for the coarse adjustment mode of the optical black offset correction apparatus.
Figure 10:
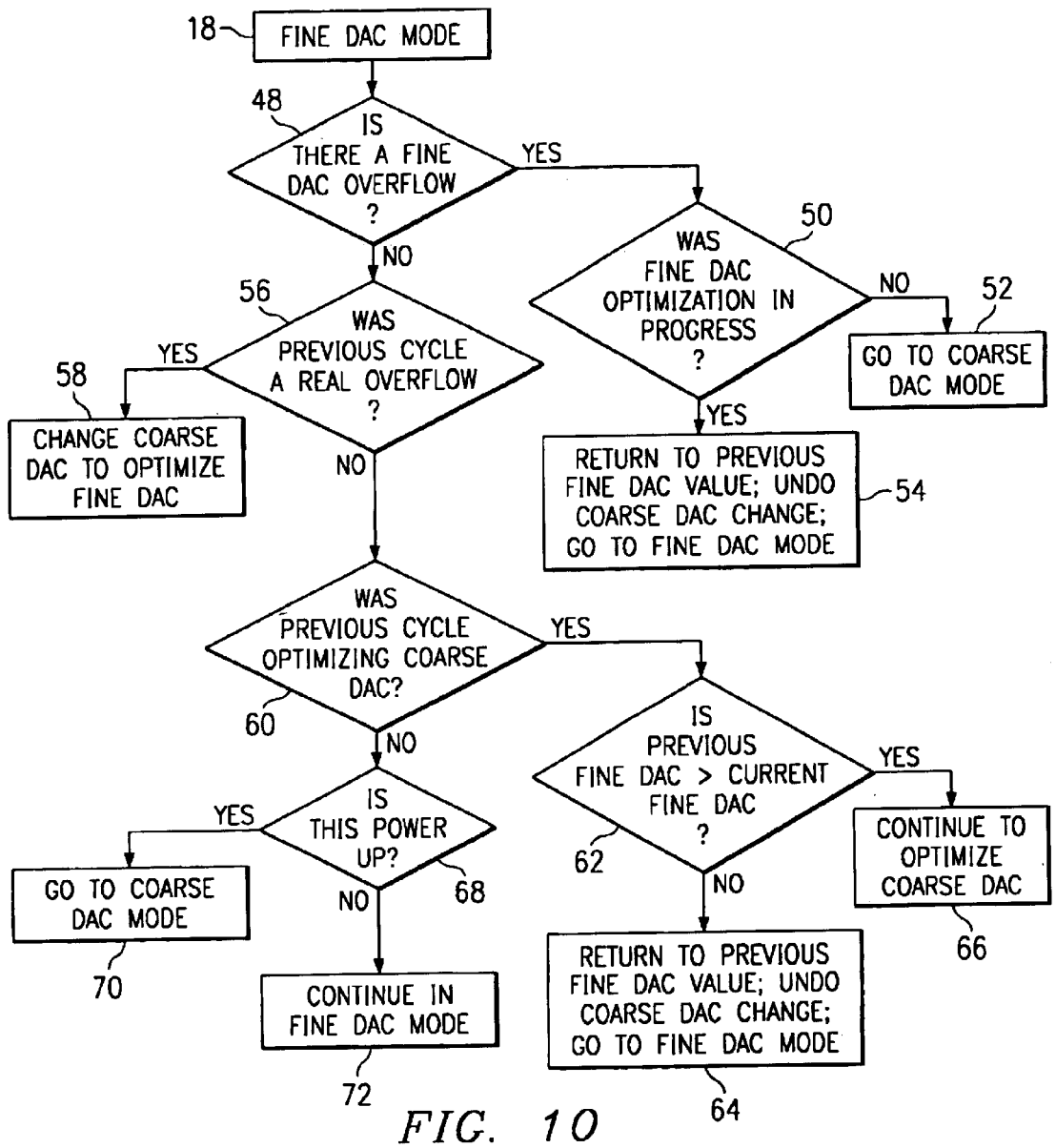
FIG. 10 is a flow chart for the fine adjustment mode of the optical black offset correction apparatus.

The method in accordance with the present application is demonstrated using the flowcharts displayed in FIGS. 8–10. Specifically, as shown in FIG. 8, step 10 represents the output from the ADC 710 to the optical black correction circuit 712. The user sets the optical black level as indicated in step 12 and optionally the gain in step 14. Accordingly, in step 16, these inputs are applied to the digital block such that it operates in a coarse mode, wherein a coarse optical black adjustment is made to the analog signal from the CCD. Afterwards, in step 18, the digital block enters a fine mode wherein a fine optical black adjustment is made to the analog signal. In step 20, it is determined whether the correction is still within the fine range. If so, the process proceeds back to step 18 such that the digital block remains in the fine mode. If not, step 16 is entered, such that the digital block operates in the coarse mode.

FIG. 9 illustrates the methodology of the coarse mode as indicated by step 16 of FIG. 8. The calibration logic within the digital optical black correction circuit 712 determines whether the gain is less than 64 in step 24. If so, as indicated by step 26, the coarse DAC 728 increments by four. If not, as indicated by step 28, the calibration logic determines whether the gain is less than 96. If so, as shown in step 30, the coarse DAC 728 is incremented by 3. If not, the calibration logic determines whether the gain is less than 128 as shown in step 32. Step 34 indicates, if so, the coarse DAC 728 is incremented by 2. Otherwise, as indicated by step 36, the coarse DAC 728 is incremented by 1.

After the coarse DAC 728 has been incremented, in step 38 it is determined whether there is a negative overflow. If so, as indicated by step 40, the coarse DAC 728 is incremented. If not, as indicated in step 42, it is determined whether there is a positive overflow. In such case, as shown in step 44, the coarse DAC 728 is decremented. If not, as step 46 indicates, no update is made to the coarse DAC 728.

FIG. 10 illustrates the methodology of the fine mode as indicated by step 18 of FIG. 9. It is first determined whether there is a Fine DAC 730 overflow in step 48. If there is an overflow, as indicated in step 50, the calibration logic determines whether the fine DAC 730 is being optimized. As shown in step 54, if so, the previous fine DAC value is used, the coarse DAC 728 change is reversed and the Fine DAC mode is initiated again in step 18. If not, as indicated by step 52, the coarse DAC mode is entered (step 16). If there is no fine DAC overflow, as indicated by step 56, it is determined whether the previous cycle was a real overflow. If so the mode is changed to coarse DAC mode to optimize the fine DAC 730, as displayed in step 58. If not, it is determined whether the previous cycle was optimizing the coarse DAC 730 as shown in step 60. If so, as shown in step 62, it is determined where the previous fine DAC adjustment is greater than the current fine DAC adjustment. If it is, step 66 instructs the digital block to continue to optimized the coarse DAC 730. Otherwise, step 64 instructs the digital block to return to the previous Fine DAC adjustment value, undo the coarse DAC adjustment and return to the Fine DAC mode (step 18). If the previous cycle was not optimizing the coarse DAC 728, as indicated by step 68, the digital block determines whether circuit 700 has just powered up. If so, the coarse DAC mode (step 16) is initiated as step 70 indicates. Otherwise, the digital block continues in the Fine DAC mode (step 18) as shown in step 72.

The advantages of the optical black correction apparatus includes but is not limited to a digitally programmable filter as opposed to an analog capacitor based integrator. Depending on the noise of the CCD, scan time, and other variables, the response time and filter bandwidth for the optical black correction can be digitally programmed. This architecture provides significant advantages over conventional architectures including digital programmability, fine resolution, and compatibility for both continuous time and discrete time programmable gain amplifiers.

The present invention finds application in a great many video systems including digital still cameras, digital video cameras, digital video processing systems, CCD signal processors, and CMOS imagers, in a variety of industrial, medical, and military sensor and imaging applications.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An image processing apparatus having offset and optical black correction circuit coupled to receive an optical black signal from a charge coupled device, comprising:

a sampling circuit for sampling the optical black signal at a predetermined reference voltage, wherein the sampling circuit comprises,
      a correlated double sampler, and
      an adder coupled to the correlated double sampler;

an analog-to-digital converter coupled to the sampling circuit for converting the sampled signal into a digital signal;

a detector circuit coupled to the analog-to-digital converter to detect the optical black level of the digital signal;

a digital averager coupled to the detector circuit to average the optical black pixels at the beginning of each line of the optical black signal;

a digital comparator, having a predetermined reference, coupled to the detector circuit to compare the optical black signal from the detector circuit to the reference and generate a difference; and a correction circuit for correcting the optical black level by feeding back the difference obtained by the digital comparator such that the difference is added and subtracted to the analog optical black signal, wherein the correction circuit couples to the adder to add the positive and negative difference to the optical black signal.

2. The apparatus having offset and optical black correction circuit as recited in claim 1, wherein the sampling circuit further comprises a programmable gain amplifier coupled to the adder to amplify the sampled optical black signal.

3. The apparatus having offset and optical black correction circuit as recited in claim 2, wherein the sampling circuit further comprises a register coupled to the programmable gain amplifier to customize the value of amplification.

4. The apparatus having offset and optical black correction circuit as recited in claim 2, wherein the correction circuit comprises a first digital-to-analog converter coupled to the adder to apply the difference to the analog optical black signal.

5. The apparatus having offset and optical black correction circuit as recited in claim 4, wherein the correction circuit further comprises a second digital-to-analog converter coupled to the sampling circuit to apply the difference to the amplified analog image signal such that the first digital-to-analog converter being operable in a coarse mode wherein a coarse adjustment is made to the analog optical black signal prior to the second digital-to-analog converter being operable in a fine mode wherein a fine adjustment is made to the amplified analog optical black signal.

6. The apparatus having offset and optical black correction circuit as recited in claim 5, wherein the correction circuit further comprises a first and a second offset register coupled to the first and second digital-to-analog converters to customize the offset value for the optical black signal.

7. An image processing method comprising the steps of:

converting a signal of reflected light off of an object photoelectrically to obtain an optical black signal;

generating a predetermined reference voltage;

clamping the optical black signal to a predetermined reference voltage;

detecting an optical black level of the clamped optical black signal;

generating a difference between the optical black level detected with a predetermined optical black level;

switching between a coarse mode and a fine mode; and correcting the optical black level by feeding back the difference corresponding to the coarse and fine mode to the clamped optical black signal.

* * * * *